United States Patent
Bahjat et al.

(10) Patent No.: US 7,510,054 B2
(45) Date of Patent: Mar. 31, 2009

(54) ENERGY SAVING ELEVATOR DISPATCHING

(75) Inventors: Zuhair S. Bahjat, Farmington, CT (US); Theresa M. Christy, West Hartford, CT (US)

(73) Assignee: Otis Elevator Company, Farmington, CT (US)

(*) Notice: Subject to any disclaimer, the term of this patent is extended or adjusted under 35 U.S.C. 154(b) by 549 days.

(21) Appl. No.: 10/582,049

(22) PCT Filed: Jan. 29, 2004

(86) PCT No.: PCT/US2004/002743

§ 371 (c)(1),
(2), (4) Date: Jun. 7, 2006

(87) PCT Pub. No.: WO2005/080247

PCT Pub. Date: Sep. 1, 2005

(65) Prior Publication Data

US 2007/0119660 A1    May 31, 2007

(51) Int. Cl.
*B66B 1/18* (2006.01)
(52) U.S. Cl. ............ 187/382; 187/388; 187/247
(58) Field of Classification Search ........... 187/247, 187/248, 380–389, 391, 393, 396
See application file for complete search history.

(56) References Cited

U.S. PATENT DOCUMENTS

| | | | |
|---|---|---|---|
| 5,024,295 A | | 6/1991 | Thangavelu |
| 5,058,711 A | * | 10/1991 | Tsuji ................ 187/383 |
| 5,235,143 A | * | 8/1993 | Bahjat et al. ......... 187/316 |
| 5,260,526 A | * | 11/1993 | Sirag, Jr. ............. 187/387 |
| 5,283,399 A | * | 2/1994 | Fujino et al. ......... 187/382 |
| 5,300,739 A | * | 4/1994 | Bittar ............... 187/385 |
| 6,401,874 B2 | * | 6/2002 | Siikonen ............. 187/382 |
| 7,392,884 B2 | * | 7/2008 | Hikita ............... 187/249 |

OTHER PUBLICATIONS

PCT International Search Report for PCT/US04/02743, dated Aug. 27, 2004.
PCT Written Opinion for PCT/US04/02743, dated Aug. 27, 2004.
International Preliminary Report On Patentability for PCT/US04/02743, dated Aug. 10, 2006.

* cited by examiner

*Primary Examiner*—Jonathan Salata

(57) ABSTRACT

When an average wait time is low (23, 24) an elevator car (31-34) is parked (39), unable to answer calls, or if a parameter (45) is low (46), the car is shut-down. If wait time is high, a parked car is assigned the call. If no cars are parked, a shut-down car may be assigned based on RRT. If up running cars can answer the call, the down running cars are excluded.

6 Claims, 5 Drawing Sheets

ENERGY SAVING ELEVATOR DISPATCHING

BACKGROUND OF THE INVENTION

1. Technical Field

This invention relates to elevator hall call assignments in a dispatching methodology in which saving energy is given greater consideration than minimizing response time to to reach a call, so long as the call can be reached within an upper limit of time.

2. Background Art

The simplest of elevator dispatching concepts is to determine which car can reach the call first. This creates bunching and is otherwise undesirable. Therefore, there are innumerable other dispatching concepts which have been practiced over the years. In one well-known concept, often called "relative response time", various penalties and bonuses are assigned in order to provide the dispatching methodology with responses that relatively reflect desired attributes of good hall call allocation. This type of hall call allocation is described in U.S. Pat. Nos. 4,363,381 and 5,024,295.

In the aforesaid patents, energy savings is given consideration by not starting a car that has its drive shut off, unless, after assigning a penalty to it, it turns out to be the best car after all, with all the other considerations taken into account. Those patents are a reflection of the times; as energy savings becomes a more important feature of an elevator, the need becomes stronger that saving energy has a more prominent role in dispatching.

DISCLOSURE OF INVENTION

Objects of the invention include: improved hall call allocation which directs more attention to saving energy; an energy saving hall call allocation methodology which nonetheless provides adequate service; and elevator dispatching in which the need to save energy is given a more paramount role while retaining the provision of good passenger service.

According to the present invention, hall call allocation in which saving energy is paramount up to the point where unacceptable service would be provided; the assignment of hall calls to cars by a dispatcher includes a plurality of features which place savings of energy ahead of the speed of hall call response, so long as hall calls will be answered within a reasonable time, that is, in less than a maximum remaining response time (RRT).

In accordance with a first aspect of the invention, whenever the average waiting time, over either a recent period of time or a recent number of calls, is less than some settable lower limit, a car is parked and rendered unable to answer hall calls. Once a car is parked as a result of a low waiting time, if another traffic indicating parameter, for example, the average number of hall calls during some period of time, indicates that traffic volume warrants it, a parked car will be shut down entirely (the drive turned off).

According to the invention, when waiting time becomes too long and there is a parked car which could answer a call within the allowed RRT, the car is immediately assigned to answer the call and the car is no longer parked.

In accordance further with the invention, if a car is shut down, any remaining response time to answer a particular call by that car has a penalty added thereto; if the RRT plus the penalty is less than the maximum allowed RRT and the average waiting time for hall calls is higher than some upper limit, a call may be immediately assigned to a shut down car and the shut down car will be started up and put back in service.

In accordance with another aspect of the invention, since the emphasis is on saving energy, all of the cars which may answer calls may be shut down, when traffic is very light, as described hereinbefore. If all of the cars are shut down, when a call request must be assigned, there is a delay time during which the ability of each of the cars to answer each of the calls is examined; the car that has the lowest maximum RRT among all of the calls that need to be assigned during that delay time is the car which is started up and has assigned to it all of the calls for which that car has an RRT of less than the upper limit.

To save energy, the invention provides another metric, which may be simply an up running car taking preference over a down running car, without regard to the RRT so long as it less than the upper limit, or which may be calculation of car load, weight, direction and distance for all cars which can be considered for answering the call, to determine which will be the most energy efficient choice. In either case, either the up running car or the car determined to be most energy efficient after calculations, will answer the call regardless of the RRT, so long as the RRT is less than a maximum RRT.

Other objects, features and advantages of the present invention will become more apparent in the light of the following detailed description of exemplary embodiments thereof, as illustrated in the accompanying drawing.

BRIEF DESCRIPTION OF THE DRAWINGS

FIGS. 1-5 are simplified, exemplary logic flow diagrams illustrating principles of the present invention, and relating respectively to:

FIG. 1 parking and shutting down cars;

FIG. 2 the overall assignment routine in which the invention may be practiced;

FIG. 3 an assignment subroutine illustrating principles of the present invention;

FIG. 4 a delay subroutine illustrating principles of the present invention; and

FIG. 5 a select subroutine illustrating principles of the present invention.

MODE(S) FOR CARRYING OUT THE INVENTION

Aspects of the invention include parking cars in a manner that does not allow them to be included in call allocation, whenever calls are being answered quickly, and actually shutting down the drives of cars when calls are being answered quickly and some other traffic parameter is present, such as a low average number of hall calls in the recent past. For various reasons, the number of cars which are shut down at any one time is monitored by an S counter. Because the objects of this invention are to conserve energy, unlike some traditional elevators, it is permitted in this embodiment to shut down all of the cars in the system in order to save energy, when that is appropriate.

Figure 1:
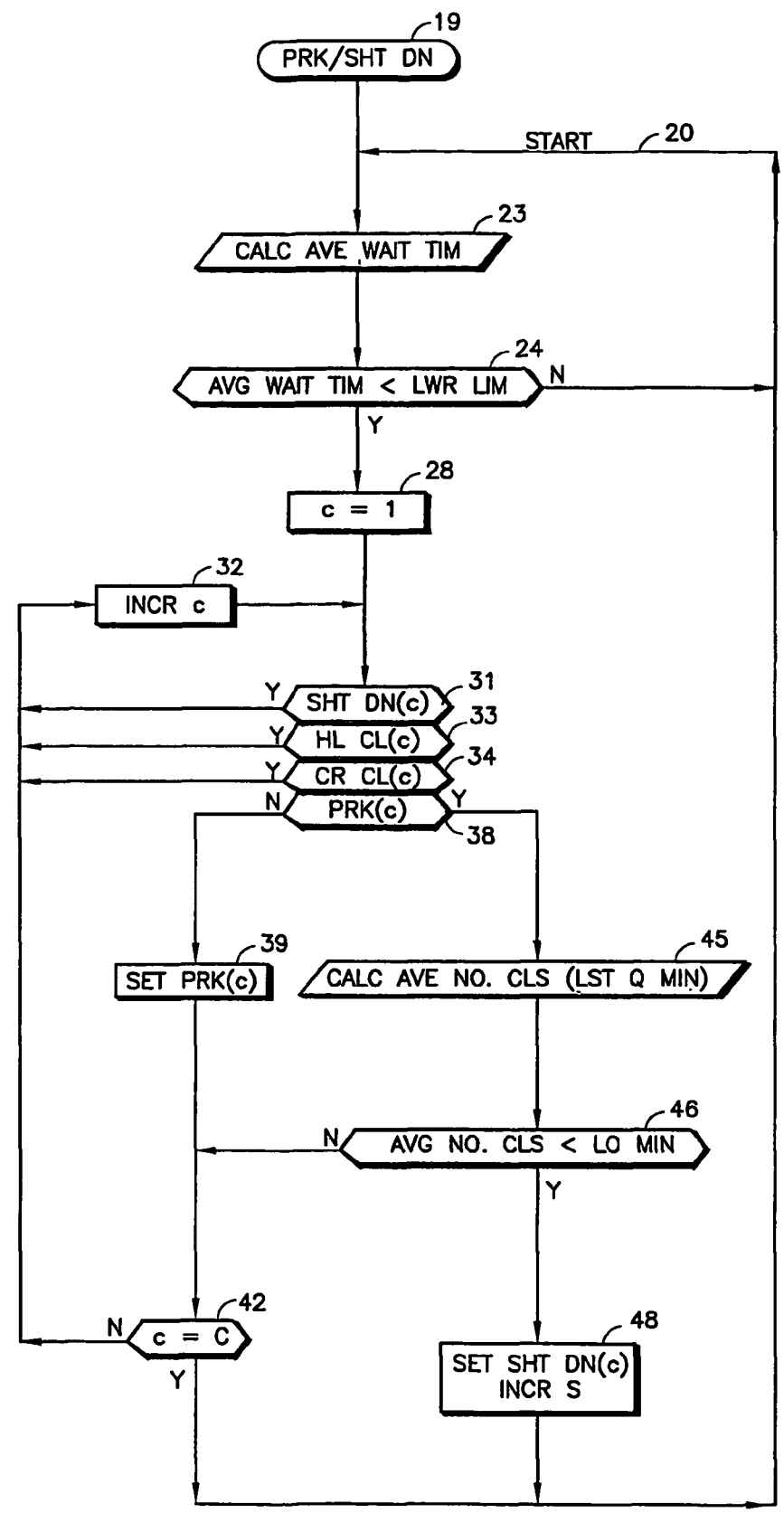

In FIG. 1, a park/shutdown (PRK/SHT DN) routine may be run continuously if the invention is embodied in a parallel processor, or it may be reached through an entry point 19 and called periodically, such as once per second, in a processor which does not accomplish parallel processing. The routine, from a start state 20, reaches a first subroutine 23 which calculates the average waiting time during either some period of time, or for some recent number (K) of hall calls. For instance, the average waiting time for the last 20 calls might be the parameter which is calculated. Then a test 24 determines if the average wait time is less than some lower limit; if it is not, the program reverts to the start state 20, since no cars will be parked or shut down except when the wait time is low.

A step 28 sets a car pointer, c, to 1 (meaning the first car in the sequence) and a test 31 determines if car c is shut down. If car c is shut down, it is eliminated from consideration for parking or shutting down, and a step 32 increments the c pointer to point to the next car in turn. A test 33 determines if car c has any hall calls and a test 34 determines if car c has any car calls. If not, this is the equivalent of there being no demand for car c. If the car has calls, then it is eliminated from consideration for being parked. Eventually, some car which is not shut down and has demand will cause a negative result of test 34 to reach a test 38 to see if car c is parked; if not, a negative result of test 38 will cause a step 39 to set a flag PRK(c) that will cause car c to be parked in a manner so that it cannot be included in hall call allocation. A test 42 determines if all of the cars have been considered, which is the case when c=C, the total number of cars available (not disabled) in the system. If not, the c counter is incremented in the step 32 and the next car is considered in sequence. When all cars have been considered, an affirmative result of test 42 causes the routine to resume the start state 20 (in parallel processing), or would cause the routine to reach a return point if parallel processing is not employed, all as is well known and forms no part of the present invention.

If on the other hand, car c is parked, an affirmative result of test 38 will cause some additional parameter to be tested, which in this embodiment is average number of hall calls, to determine if a parked car should be shut down. A subroutine 45 calculates the average number of hall calls during some recent period of time, which may be adjustable: for instance, it may be five minutes during the day time and 30 minutes at night. Or, it may be adjusted at any time dependent upon the time of day or the traffic level in the building. Similarly, the subroutine 23 could be based upon time or a group of calls, either of which could be adjusted at any time to reflect the general traffic level or time of day.

A test 46 determines if the average number of calls (or some other parameter, if desired), is less than some low limit and if so, a step 48 will set a flag to shut down car c (SHT DN(c)), and a step 49 will increment a "shut down car" counter, S. Once any car is shut down, the program reverts to the start state. If test 46 is negative, that will reach step 42 to cause the next car in turn to be examined. In this embodiment, a car can be shut down, and another car parked; then the parked car can also be shut down. This may continue until all cars are shut down. If desired, the routine may be changed so as to park two or more cars before any car is shut down.

In a typical fashion, hall call allocation of this embodiment considers hall calls (if any) in every floor in one direction, and then considers hall calls (if any) of every floor in an opposite direction.

Figure 2:
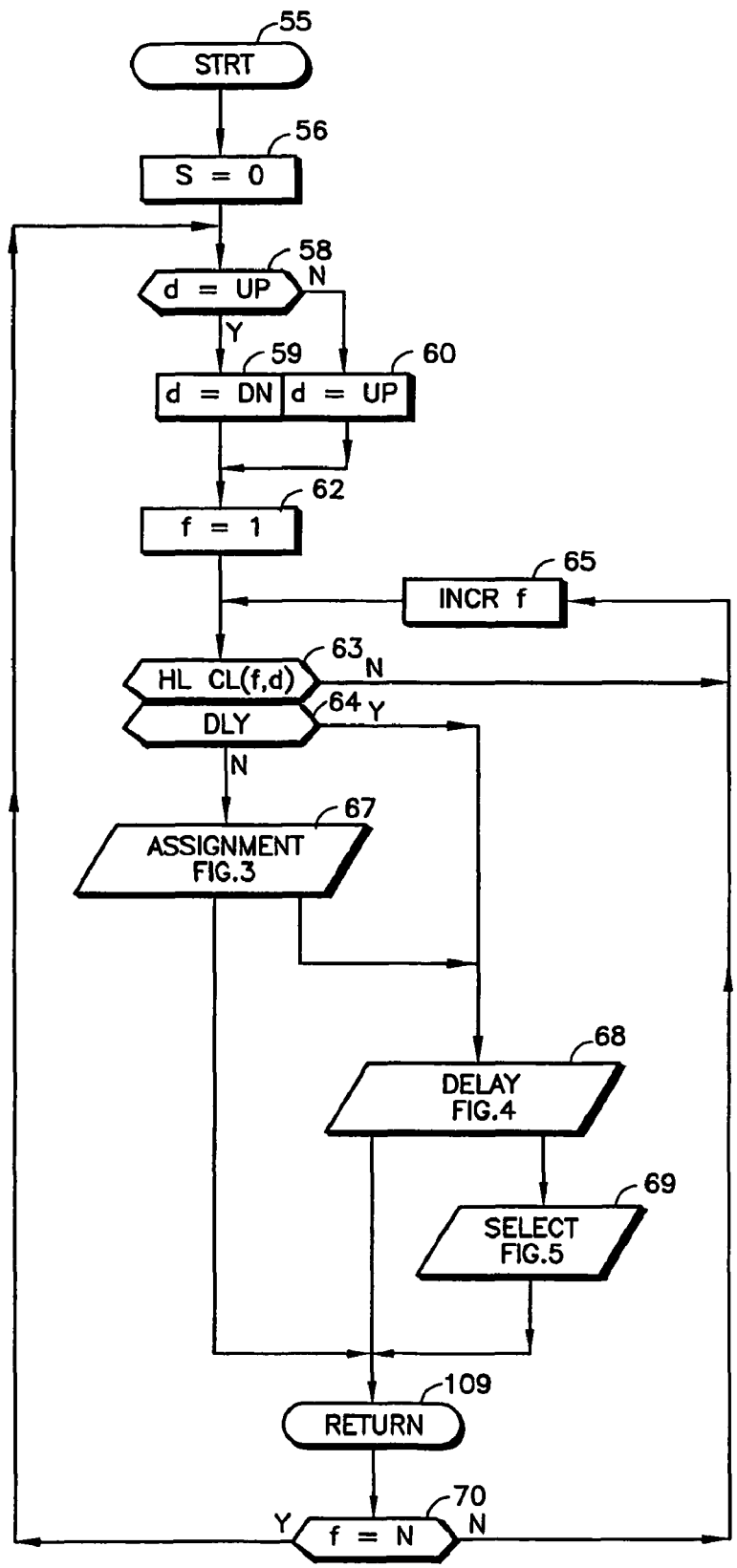

Referring to FIG. 2, the hall call assignment routine advances from a start state 55 to set the shut down counter, S, to zero in a step 56; this is done only when the system is brought on line; thereafter, the setting of S depends only on events. A test 58 determines if a direction indicator for the assignment routines, d, is set to up or not. If it is set to up, then a step 59 reverses the setting, to down. But if the indicator is not set, to up, then a step 60 reverses the indication by setting it to up.

A step 62 sets a floor indicator, f, equal to one (not necessarily meaning the first floor, but the floor that is first in the sequence of consideration). A test 63 determines if there is any hall call on floor f in direction d. If not, a step 65 increments the f counter and the next floor in turn is examined in the step 63 to see if it has a hall call in the current direction.

When there is a hall call at the current floor and direction, a test 64 determines if a delay flag, DLY, has been set, or not, as described with respect to FIG. 4 hereinafter. If not, an assignment subroutine 67 is reached in FIG. 3, which may or may not be followed by a delay subroutine 68 in FIG. 4 and a select subroutine 69 in FIG. 5. The return point 109 allows the return to FIG. 2 from FIGS. 3-5.

Then a test 70 determines if the number of floors which have been considered equals the total number of floors to be considered. Before all floors are considered, a negative result of test 70 reaches a step 65 to increment f, so that the routines 67-69 can be repeated for the next floor in turn. When all floors have been given consideration, an affirmative result of test 70 reverts the routine to the test 58, which reverses the direction, and the floor-by-floor process is commenced again.

Figure 3:
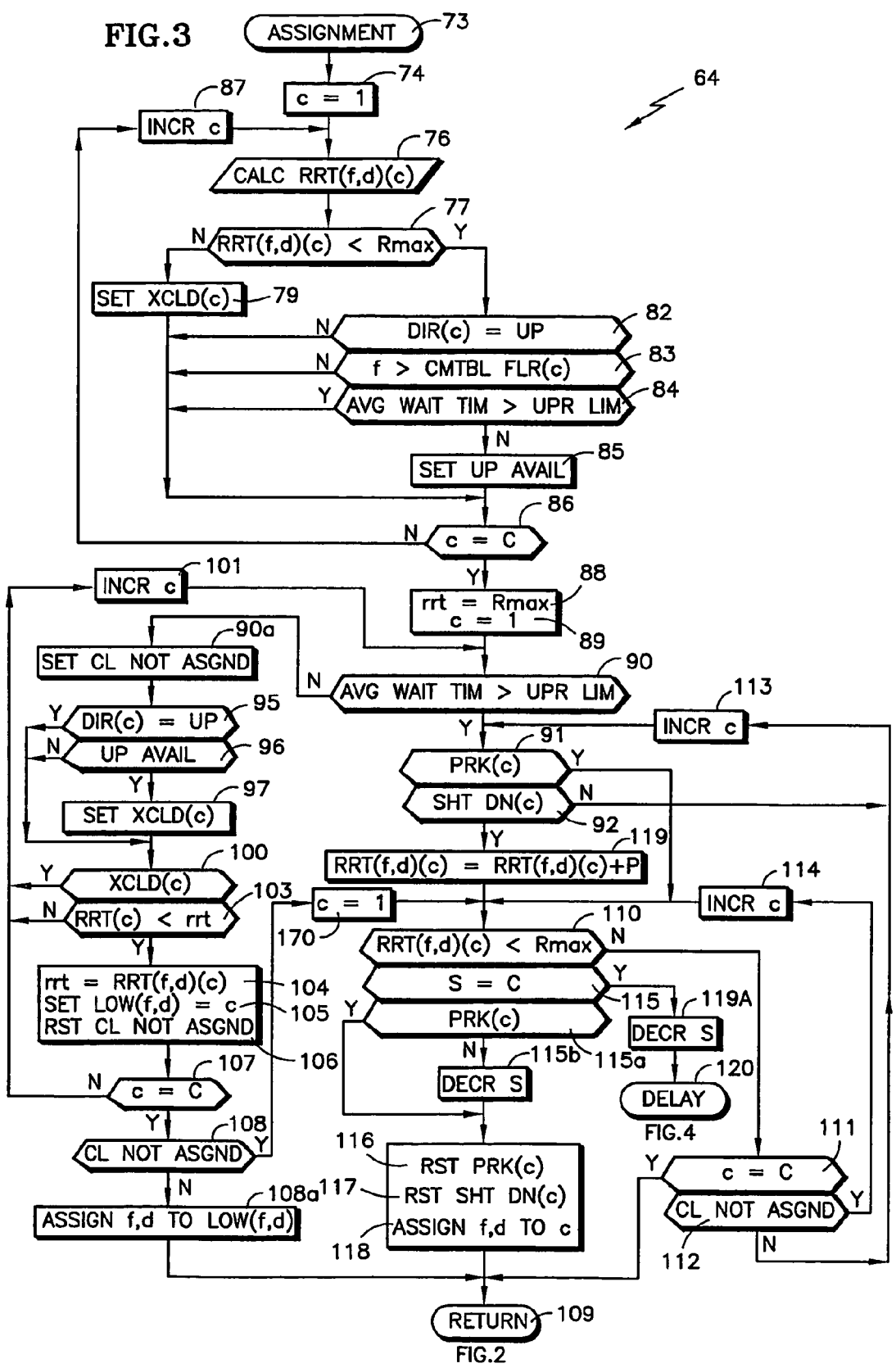

The assignment subroutine 73 is reached in FIG. 3, through a transfer point 73; a first step 74 sets the car pointer to one. Then a subroutine 76 calculates the remaining response time (RRT) for car c to answer the call at floor f in the direction d, RRT(f,d)(c). A test 77 determines if the RRT which has just been calculated is less than some maximum RRT, Rmax. If it is equal to or more than the maximum, a step 79 causes a flag, XCLD(c), to indicate that car c is excluded from consideration in assigning the present hall call.

If the RRT for this car for the hall call under consideration is less than the maximum RRT, an affirmative result of test 77 reaches a test 82 to determine if the direction of this car is up. If it is, a test 83 determines if the floor of the hall call under consideration is higher than the committable floor of this car. If test 83 is affirmative, a test 84 determines if the average waiting time is greater than some upper limit. If not, then a flag is set in a step 85 to indicate that there is an up running car available to answer this call. Note that this happens whether or not the call is an up call or a down call. This is another aspect of the present invention: if an up running car can answer a call within the limited time (Rmax), when the average call waiting time is within normal bounds, then down running cars will not be allowed to answer that call. The purpose, as described hereinbefore, is that it takes less energy to operate cars upwardly than it does to operate cars downwardly. If a more complex system is desired, this metric can be converted to a full calculation of total car load, weight, direction and distance. But in this embodiment, the lower energy metric is simply whether it is running upwardly. If any of tests 82, 83 is negative or test 84 is positive, the step 85 is bypassed.

Until all cars have had their RRTs calculated and examined. against the limit to determine whether the car would be excluded and to determine whether it is an available up car, a test 86 will be negative reaching a step 87 to increment the car counter, c, and repeat the process.

When all cars have been considered, test 86 is affirmative reaching a step 88 to set an interim RRT, rrt, to the maximum RRT, Rmax, and a step 89 sets the car counter equal to one. A test 90 will determine whether the average waiting time is greater than some upper limit. If not, a step 90*a* sets a flag indicating that the call has not been assigned (described later). Then, a test 95 determines if this car's direction is up; if not, a test 96 determines if the up available flag has been set in the step 85. If it has been, then the flag to exclude car c from consideration, XCLD(c), the same as is set in step 79, is set in a step 97.

A test 100 determines if car c is excluded from hall call consideration. If it is, the program reverts to a step 101 to increment the car counter, c, so that the next car in turn can be considered. If car c is not excluded, a test 103 determines if the remaining response time for this car to answer the call under consideration is less than the interim RRT, rrt, which was set to Rmax in step 88. If the RRT is less than Rmax at this stage of the routine, an affirmative result of test 103 will reach a step 104 to set the interim RRT equal to the RRT of this call for this car. In subsequent passes through the test 103, rrt will be the lowest RRT of any previous car tested for this call. A step 105 will set a value indicating which car has the lowest RRT, LOW(f,d), equal to this car, c, and a step 106 will reset the call not assigned flag. Then a test 107 determines if all cars have been considered; if not, the step 101 will increment c and the process will repeat for the next car in turn.

So long as the average wait time is below the upper limit, all of the cars that are not excluded will have their RRTs compared with the interim RRT so that, eventually, the step 105 will identify the car with the lowest RRT for answering the call under consideration. When all cars have been considered, an affirmative result of test 107 reaches a test 108 to determine if the call has been assigned; if so, a step 108a will assign the present call, f, d, to the car identified in step 105 as having the lowest RRT. The program then reverts to FIG. 2 through the return point 109.

Assuming that the average wait time is above the upper limit and that this car, c, is parked: an affirmative result of tests 90 and 91 will reach a test 110 to determine if the remaining response time for this car to answer this call is less than a maximum RRT. If it is not, a negative result of test 110 reaches a test 111 to see if all cars have been considered, and if not, reaches a test 112 (described later). Assuming test 112 is negative, a step 113 increments c so that the next car in turn can be given assignment consideration.

But if the RRT is less than the max for this car, then this call will be assigned to the parked car so as to reduce the waiting time. This is achieved by passing through a test 115 to determine if the number of shut down cars, S, is equal to the full number of operable cars. Since a parked car is not shut down, S cannot=C and test 115 will inherently be negative for a parked car, as will a test 115a, reaching steps 116, 117 to reset PRK(c) and SHT DN(c) (only the appropriate one will have any effect) and a step 118 to assign this call to this car. This is a feature of the invention: parked cars will be isolated from call assignment until the wait time is too long, and then they become unparked by preferentially being assigned to the first call that the car can reach within a permissible response time.

Assume now that car c is shut down. An affirmative result of test 90, a negative result of test 91, and an affirmative result of test 92 reaches a step 119 to add a penalty, P, which may be on the order of three seconds, to the RRT for this car to answer the call under consideration. The test 110 determines if the RRT is less than the maximum even with the penalty. If so, the test 115 determines whether the number of shut down cars is equal to the maximum number. If not, test 115a is affirmative, reaching a step 115b to decrement S, and then steps 116, 117 do the resets and step 118 assigns this call to this car, in the same fashion as for a parked car, and the program reverts to FIG. 2 through return point 109.

Figure 4:
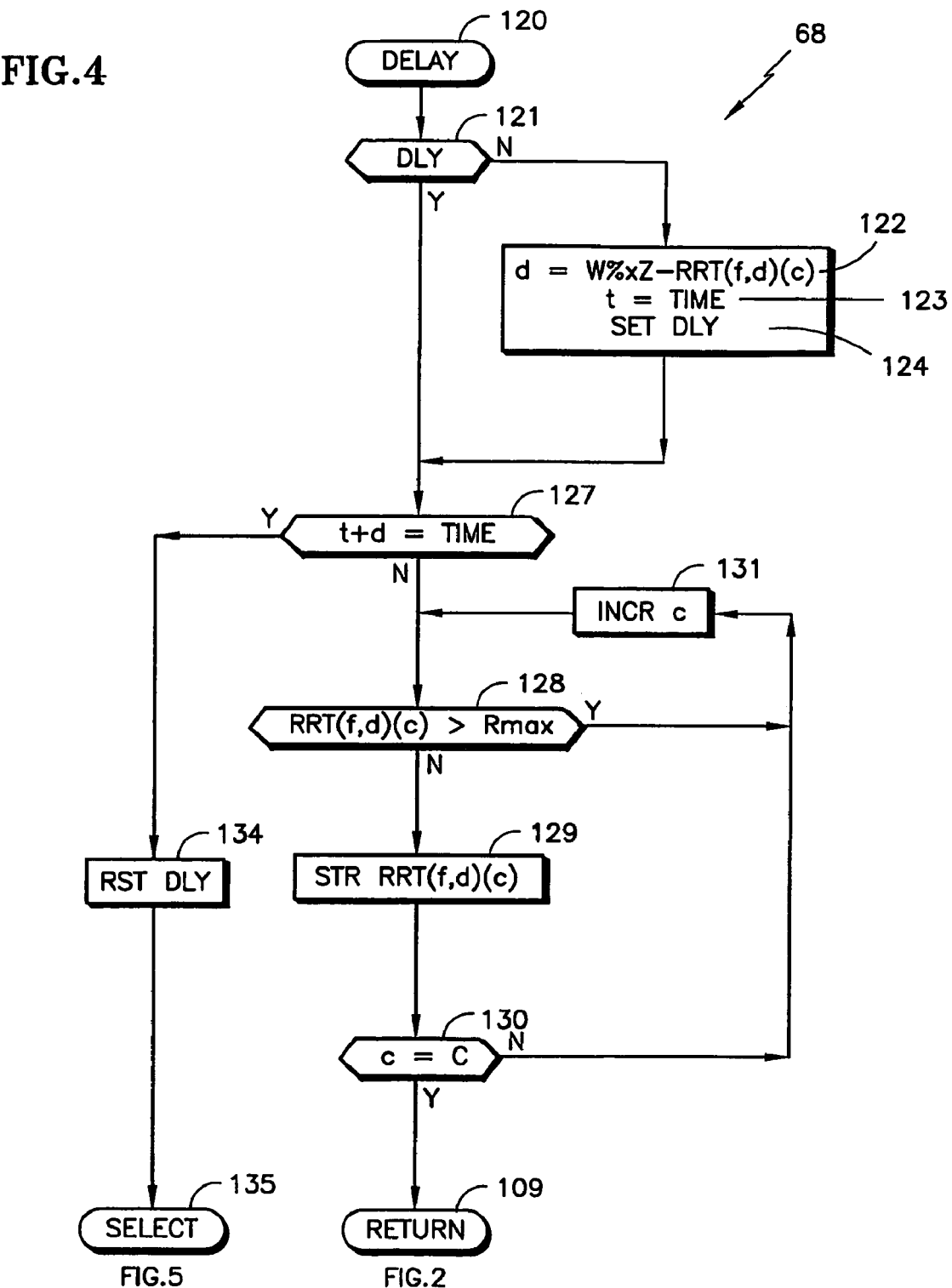

On the other hand, if the maximum number of cars that can be shut down have been shut down, then test 115 will be affirmative, a step 119a will decrement S and the routine advances to the DELAY subroutine in FIG. 4 through a transfer point 120. A first test 121 will see if the delay flag (DLY) has been set or not. Initially, it will not have been set so a step 122 will set a delay factor, d, equal to some percentage, such as 50%, of some delay threshold, such as 60 seconds, minus the remaining response time for this car to answer the call under question. Then a step 123 sets a start time, t, equal to the time of day (TIME), and a step 124 sets the delay flag.

A test 127 determines if the sum of start time plus the delay factor is equal to or greater than the current time. If not, a test 128 determines if the RRT of the car under consideration to answer the call under consideration is more than Rmax. If so, a step 131 increments the car counter, c, to consider the next car in sequence. If Rmax is not exceeded, a negative result of test 128 reaches a step 129 to store the RRT for this car to answer this call, RRT(f,d)(c). A test 130 determines if the c counter is set to the maximum number of cars, or not; if the c counter has not reached maximum, a negative result of test 130 reaches the step 131 to increment the c counter, and the test 128, if negative, will reach the step 129 to store the RRT for this next car to answer the call under question. When the c counter reaches maximum, an affirmative result of test 130 passes the routine through the return point 109 to reach the test 70 in FIG. 2, as described hereinbefore.

Since the delay flag has now been set, in each subsequent pass through the routine of FIG. 2, instead of reaching the assignment routine 67, an affirmative result of test 64 causes the program to advance directly to the delay subroutine 68. This will continue throughout the delay period, so that each hall call will have remaining response times for all of the cars stored, if less than Rmax. When the delay period ends, the test 127 (FIG. 4) will be affirmative reaching a step 134 to reset the delay flag, and the select routine of FIG. 5, through a transfer point 135.

After the delay time, the car that will be started in order to respond to at least one call, or possibly several calls, will be selected. In this embodiment, the response times (less than Rmax) for all cars to answer each call are stored, and then the car with the highest RRT (for any call) is eliminated until there is only one car left, which is assigned all hall calls that were made during the delay period, for which the RRT is acceptable.

Figure 5:
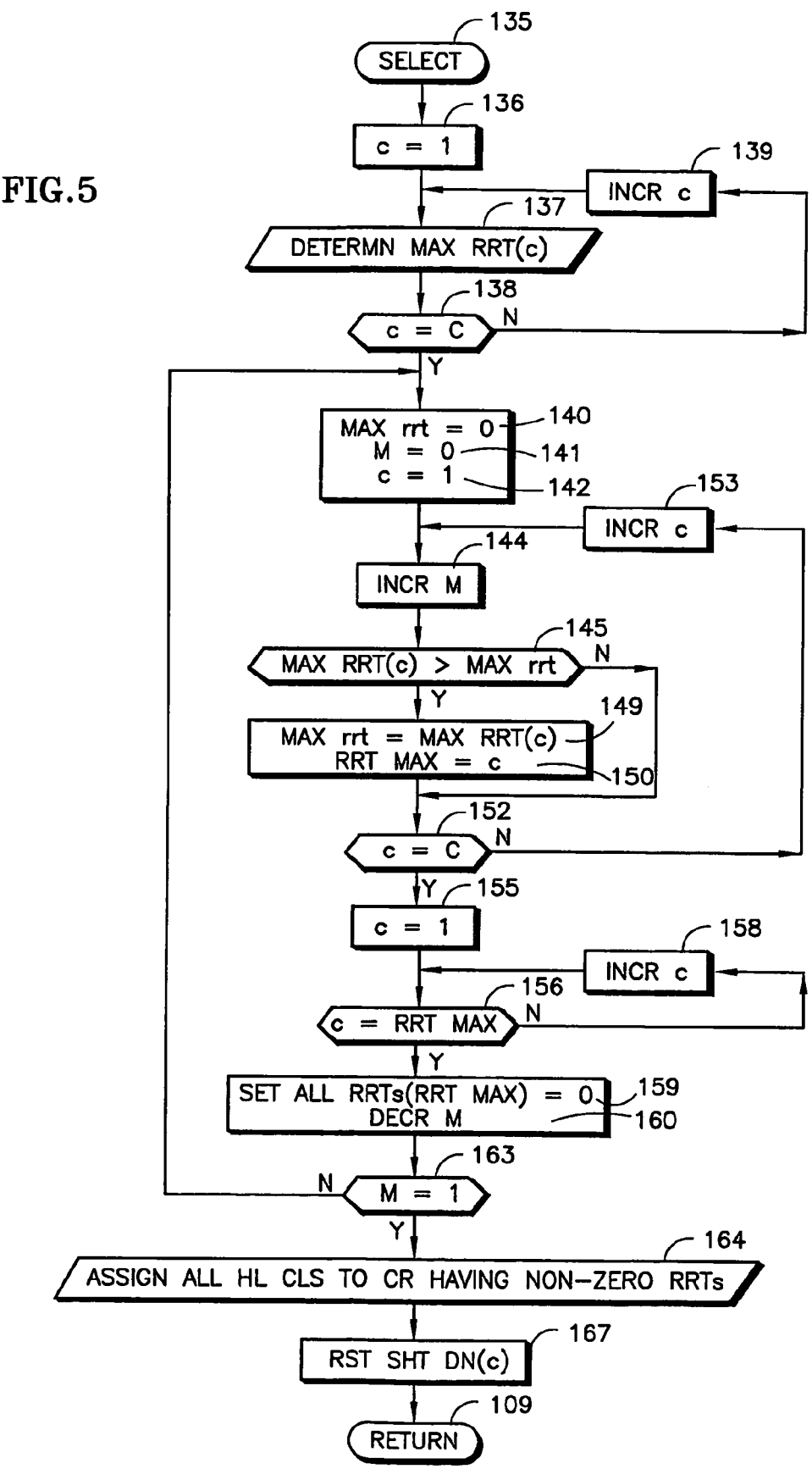

In FIG. 5, the select subroutine is reached through the transfer point 135; a first step 136 sets the car counter, c, to one, and a subroutine 137 determines the maximum RRT for car c; that is, of all the RRTs which were determined for various calls with respect to car c, which is the highest RRT. A first test 138 determines if the maximum RRT has been determined for all cars, c; if not, a step 139 increments c, and the subroutine 137 is repeated for the next car. When all cars have been determined, a step 140 sets an interim value, MAX rrt, equal to zero. A step 141 sets a factor, M, indicative of the number of cars tested and to be thereafter eliminated, so that in each pass through the select subroutine of FIG. 5 the car with the highest maximum RRT can be eliminated from consideration, and the remainder tested to find which car now has the highest RRT until only one car is left. The c counter is set to one in a step 142.

The M counter is then incremented in a step 144 and a test 145 determines if the maximum RRT of car c is greater than the interim maximum RRT (MAX rrt). If it is, then the RRT of car c becomes the interim maximum RRT in a step 149, and the car with the highest RRT is defined as car c in a step 150, MAXrrt=c. A test 152 determines if all cars have had their maximum RRTs determined and compared against the interim maximum RRT. If not, a step 153 increments the car counter and the maximum RRT for the next car in turn is determined and tested against the interim maximum RRT.

When all cars have been considered, test 152 is affirmative and a step 155 sets the car counter equal to one. A test 156 determines if the car identified as having the maximum RRT determined by test 145 and step 150 is in fact the car under consideration, c. If not, then a step 158 increments the car counter and the test is performed for the next car in turn. When the car is found that has the maximum RRT determined by the step 145, an affirmative result of test 156 causes a step 159 to set all of the RRTs for the car having the highest maximum RRT to zero, thereby eliminating the car having the highest RRT to any of the calls that came in during the delay period.

Then, the M counter is decremented in a step 160. A test 163 determines if M has been reduced to one, or not. Initially, it will not, so the program reverts to the steps 140-142 to repeat the process of determining which car has the maximum RRT determined for any call. In each pass from the step 140 to the step 160, one more car is eliminated and M is decremented. When test 163 indicates that only one car is left (that did not have its RRTs zeroed), a subroutine 164 will assign all the hall calls to that car. A step 167 resets the shut down flag for car c, putting it back into normal service. Then the program reverts to FIG. 2 through the return point 109.

A situation can occur that there can be a call which can be answered within the allowable time by a car; which however, was also able to answer one or more other calls with high RRTs and was thus eliminated. This call may also be outside the maximum time for the car which was the last car standing, having non-zero RRTs. It could thus occur that a call which is answerable by one car is not answerable by the selected car, and that call will then apparently go unanswered. However, since the entire assignment routine for all the floors and all the cars is processed several times a second, it will not be long before that call will be presented to the assignment routine of FIG. 3. If the average wait time is still less than the upper limit, which it very well likely will be, then the process of tests 91 or 92 being affirmative, test 110 being affirmative, and test 115 being negative will cause that call to be assigned to one of the cars immediately. If on the other hand, the average wait time is no longer greater than the upper limit, the call will pass through the steps and tests 90-107 without having been assigned. Therefore, the test 108 will be affirmative causing the subroutine of FIG. 3 to advance to the test 110 with c equal to one, and cycling through negative results of tests 111 and 112, with the c counter incremented by step 114, until a car that can handle the call (some car always can), in which case test 110 will be affirmative. Since at least one car is no longer shut down, test 115 will be negative and this call will be immediately assigned to one of the cars by the step 118.

If during a pass through the steps and tests 90a-106 a call is not assigned to a car under consideration, which might occur with a down call when an up car is below the call, but the up car RRT is too high, test 108 will be affirmative leading to a step 170 to set c equal to 1. Then the routine will pass through tests 110, 111 and 112 and step 114 until a car is found to take the call. That car might be the car that was eliminated because of an up car being available.

Although the various aspects of the invention may be most useful if all are used together, as in the exemplary embodiment herein, each may be used without any others, or each may be used with less than all of the others.

The invention claimed is:

1. An energy saving method of assigning elevator cars to answer hall calls, comprising:

calculating an average wait time (23) for passengers to have their request for service subsequent to entering a hall call over either (a) a recent number of calls or (b) a recent extent of time;

characterized by:

if said average wait time is less than a wait time lower limit (24), determining (31-34) if there is a car with no demand, and in that event either (c) setting a flag (39) to cause said car to become parked and to be excluded from answering hall calls, or (d) calculating (45) an additional parameter indicative of recent traffic level, and if said parameter is below a lower limit thereof (45), setting a flag (48) to cause said car to shut down with its drive off;

if said average wait time is more than a wait time upper limit (90) and a parked car (91) can answer a current hall call request in less than a maximum remaining response time (110), (e) assigning said current hall call (118) to said parked car and causing (116) said parked car to enter full service, or if there is no parked car (91) but there is a car that has been shut down (92) and said shut down car can answer said current hall call with a remaining response time (RRT) which is less than the maximum RRT (110) by a penalty amount (119), then (f) if not all of the cars are shut down (115), assigning said current hall call to said shut down car (118), and starting said car (117) so as to return it to full service, (g) if all of said cars are shut down (115), entering into a delay period (121-124) during which all of the acceptable (128) RRTs for all calls that are entered for assignment during the delay period for each of the cars are stored (129), and after the delay period, selecting (145, 149, 150, 156, 159) a car which has the lowest maximum RRT, among all the calls to be assigned which are less than the upper RRT limit, to answer all of the calls which can be assigned to it with less than the RRT upper limit, and restarting (167) said car and putting said car in service to answer all of said calls and to remain in full service;

if said average wait time is not more than said wait time upper limit, assigning a specific hall call to a specific car having the lowest RRT to said specific hall call (103-106) unless said specific car is down running (95) and said specific call can be answered (83) by an up running car (82) with an RRT less than maximum (77).

2. An energy saving method of assigning elevator cars to answer hall calls, comprising:

calculating an average wait time (23) for passengers to have their request for service subsequent to entering a hall call over either (a) a recent number of calls or (b) a recent extent of time;

characterized by:

if said average wait time is less than a wait time lower limit (24), determining (31-34) if there is a car with no demand, and in that event either (c) setting a flag (39) to cause said car to become parked and to be excluded from answering hall calls, or (d) calculating (45) an additional parameter indicative of recent traffic level, and if said parameter is below a lower limit thereof (45), setting a flag (48) to cause said car to shut down with its drive off.

3. An energy saving method of assigning elevator cars to answer hall calls, comprising:

calculating an average wait time (23) for passengers to have their request for service subsequent to entering a hall call over either (a) a recent number of calls or (b) a recent extent of time;

characterized by:

if said average wait time is less than a wait time lower limit (24), determining (31-34) if there is a car with no demand, and in that event setting a flag (39) to cause said car to become parked and to be excluded from answering hall calls;

if said average wait time is more than a wait time upper limit (90) and a parked car (91) can answer a current hall call request in less than a maximum remaining response time (110), assigning said car (118) to said parked car and causing (116) said parked car to enter full service.

4. An energy saving method of assigning elevator cars to answer hall calls, comprising:

calculating an average wait time (23) for passengers to have their request for service subsequent to entering a hall call over either (a) a recent number of calls or (b) a recent extent of time;

characterized by:

if said average wait time is less than a wait time lower limit (24), determining (31-34) if there is a car with no demand, and in that event calculating (45) an additional parameter indicative of recent traffic level, and if said parameter is below a lower limit thereof (45), setting a flag (48) to cause said car to shut down with its drive off;

if said average wait time is more than a wait time upper limit (90) and there is a car that has been shut down (92) and said shut down car can answer a hall call currently being assigned with a remaining response time (RRT) which is less than the maximum RRT (110) by a penalty amount (119), then assigning said call to said shut down car (118), and starting said car (117) so as to return it to full service.

5. An energy saving method of assigning elevator cars to answer hall calls, comprising:

calculating an average wait time (23) for passengers to have their request for service subsequent to entering a hall call over either (a) a recent number of calls or (b) a recent extent of time;

characterized by:

if said average wait time is less than a wait time lower limit (24), determining (31-34) if there is a car with no demand, and in that event calculating (45) an additional parameter indicative of recent traffic level, and if said parameter is below a lower limit thereof (45), setting a flag (48) to cause said car to shut down with its drive off;

if said average wait time is more than a wait time upper limit (90) there is a car that has been shut down (92) and said shut down car can answer a hall call currently being assigned with a remaining response time (RRT) which is less than the maximum RRT (110) by a penalty amount (119), then (a) if not all of the cars are shut down (115), assigning said call to said shut down car (118), and starting said car (117) so as to return it to full service, (b) if all of said cars are shut down (115), entering into a delay period (121-124) during which all of the acceptable (128) RRTs for all calls that are entered for assignment during the delay period for each of the cars are stored (129), and after the delay period, selecting (145, 149, 150, 156, 159) a car which has the lowest maximum RRT, among all the calls to be assigned which are less than the upper RRT limit, to answer all of the calls which can be assigned to it with less than the RRT upper limit, and restarting (167) said car and putting said car in service to answer all of said calls and to remain in full service.

6. An energy saving method of assigning elevator cars to answer hall calls, comprising:

calculating an average wait time (23) for passengers to have their request for service subsequent to entering a hall call over either (a) a recent number of calls or (b) a recent extent of time;

characterized by:

if said average wait time is not more than said wait time upper limit, assigning a specific hall call to a specific car having the lowest RRT to said specific hall call (103-106) unless said specific car is down running (95) and said specific call can be answered (83) by an up running car (82) with an RRT less than maximum (77).

* * * * *